(12) United States Patent
Berger et al.

(10) Patent No.: US 11,415,375 B2
(45) Date of Patent: Aug. 16, 2022

(54) THERMAL COMPONENT, METHOD FOR PRODUCING SAME, AND HEAT EXCHANGER

(71) Applicant: MAHLE International GmbH, Stuttgart (DE)

(72) Inventors: Thierry Berger, Thionville (FR); Gary Scott Vreeland, Medina, NY (US)

(73) Assignee: MAHLE International GmbH, Stuttgart (DE)

( * ) Notice: Subject to any disclaimer, the term of this patent is extended or adjusted under 35 U.S.C. 154(b) by 395 days.

(21) Appl. No.: 15/894,179

(22) Filed: Feb. 12, 2018

(65) Prior Publication Data

US 2019/0249933 A1 Aug. 15, 2019

(51) Int. Cl.

| | |
|---|---|
| *F28F 1/40* | (2006.01) |
| *B21D 53/06* | (2006.01) |
| *B21D 53/02* | (2006.01) |
| *F28F 13/12* | (2006.01) |
| *B23P 15/26* | (2006.01) |
| *B23P 11/00* | (2006.01) |

(52) U.S. Cl.
CPC ............. *F28F 1/40* (2013.01); *B21D 53/022* (2013.01); *B21D 53/06* (2013.01); *B23P 15/26* (2013.01); *F28F 13/12* (2013.01); *B23P 11/00* (2013.01)

(58) Field of Classification Search
CPC .. F28F 1/40; F28F 13/12; F28F 9/0202; F28F 9/0204; F28F 9/0214
See application file for complete search history.

(56) References Cited

U.S. PATENT DOCUMENTS

| | | | | |
|---|---|---|---|---|
| 5,174,373 A | * | 12/1992 | Shinmura | F28D 1/05391 165/102 |
| 5,582,239 A | * | 12/1996 | Tsunoda | B21D 53/02 165/176 |
| 5,868,198 A | * | 2/1999 | Kato | B21D 53/04 165/153 |
| 8,151,871 B2 | * | 4/2012 | Forster | F28D 1/05366 165/173 |
| 8,851,158 B2 | * | 10/2014 | Alahyari | F28F 9/0217 165/174 |
| 2005/0247443 A1 | * | 11/2005 | Kim | F28D 1/05391 165/176 |
| 2009/0056919 A1 | | 3/2009 | Hoffman et al. | |

* cited by examiner

*Primary Examiner* — Jon T. Schermerhorn, Jr.
(74) *Attorney, Agent, or Firm* — Dickinson Wright PLLC

(57) ABSTRACT

In a method for producing a thermal component (1, 1') a pipe (2, 2',2") having a fluid channel (3, 3', 3") with an inner profile (4, 4') is provided, and a swirler (6, 6') having an outer profile (5, 5') corresponding to the inner profile (4, 4') is inserted into the fluid channel (3, 3', 3"). A thermal component (1, 1') manufactured in this manner includes a pipe (2, 2', 2") having a fluid channel (3, 3', 3"), and a swirler. The fluid channel (3, 3', 3") of the pipe (2, 2', 2") includes an inner profile (4, 4') corresponding to an outer profile (5, 5') of the swirler (6, 6'), and the swirler is disposed in the fluid channel (3, 3', 3").

6 Claims, 4 Drawing Sheets

THERMAL COMPONENT, METHOD FOR PRODUCING SAME, AND HEAT EXCHANGER

TECHNICAL FIELD

The invention at hand relates to a method for producing a thermal component having a pipe, to the thermal component itself, as well as to the preferred method of use thereof.

BACKGROUND

New electric motor driven vehicles require an increasing amount of thermal components to cool electrical components. Solutions, which are available on the market, use an injection process to produce a pipe with optimum compromise between coolant pressure drop and heat conductivity. However, such a pipe cannot be produced in one piece at low costs. In the simplest case, a "thermal component" is hereby understood to be a pipe of a heat exchanger, in which a swirler or turbulator is arranged, which improves the heat transfer between the pipe and the fluid guided in the pipe. The thermal component can also have a plurality of such pipes with integrated swirler or turbulator, respectively, and can form a pipe bundle or a heat exchanger unit, respectively.

FIG. 1 shows an air-coolant heat exchanger from the prior art, comprising a thermal component 1-1, which comprises pipes 2-1, in the respective fluid channel 3-1 of which an air swirler 6-1 is inserted. A respective coolant swirler 6-2 is arranged between the individual pipes 2-1. The thermal component 1-1 is accommodated in a housing 12 as a whole, in order to be able to be installed as integrated heat exchanger unit. The air swirler 6-1 is thereby press-fitted strongly with the pipe 2-1, in order to ensure a thermal contact on both sides. Next, the coolant swirler 6-2 is inserted between the consecutive pipes 2-1 to pass on the mechanical press-fitting and to establish a contact, which has the required thermal conductivity, to the air swirler 6-1 via the pipe 2-1.

However, the injection process for such a pipe is too expensive and difficult, even though long contact surfaces ensure a good heat conductivity. In addition, such a pipe requires a very uniform wall thicknesses. One possibility would be to insert a preformed swirler into the pipe. This, however, does not ensure a press-fitting between swirler and pipe, which would be required in response to the soldering of the core. This would then not ensure the heat conductivity required for the function of the thermal component.

SUMMARY OF THE INVENTION

It is an object of the present invention is to provide a simple assembly of a thermal component with a high degree of heat conductivity.

The invention at hand is based on the general idea of arranging a swirler inside a pipe with the help of an industrial process and to nonetheless make it possible to press-fit the swirler, so that a robust soldering and robust heat conductivity of the thermal component, which is obtained therewith, can be generated. The solution according to the invention thereby starts with largely standardized starting components, in the case of which the swirler is inserted into the pipe, in order to obtain the thermal component with acceptable performance values. One option thereby provides to attach the outer profile of the swirler inside the fluid channel during the extrusion process. On the one hand, the position of the swirler can thus be fixed and the presence of a contact surface prior to the soldering between pipe and swirler can be ensured. In addition, the entanglement of the inner profile of the fluid channel with the outer profile of the swirler can also contribute to the press-fitting of the swirler inside the pipe.

According to this, provision is made in a first embodiment of the method according to the invention for the inner profile to be formed by a sliding plate, which is inserted between pipe and swirler. The pipe can thus be embodied as standardized component without specific inner profile of the fluid channel, to which the swirler also does not need to have a press fit and into which it can thus be introduced more easily. The sliding plate can be embodied so as to be correspondingly thin and rigid, in order to be inserted easily between swirler and pipe and to ensure a desired press-fitting at that location. As a result, not only a good heat conductivity is created between pipe and swirler, but a simple soldering of both parts can also be carried out. The sliding plate is preferably provided with a rolled or punched surface profile, so as to have a high stiffness on the one hand and so as to thus be capable of being used particularly easily. On the other hand, the press-fitting is increased and the thermal contact between swirler and pipe is thus improved. Both shaping processes for the sliding plate can be carried out particularly easily, accurately and quickly thereby.

In a further embodiment of the method according to the invention, provision is made for the inner profile to be attached integrally with the pipe. A pipe, which is standardized per se, would thus only need to be supplemented by the inner profile, whereby it can preferably be produced particularly easily, simultaneously true to size and cost-efficiently in an extrusion process.

In a further embodiment of the method according to the invention, provision is made for the pipe to be embodied with a longitudinal gap for the sliding plate. The sliding plate can thus be attached particularly easily in the pipe, in particular also when the swirler is inserted into a fluid channel of the pipe only subsequently. The sliding plate as well as the pipe can thereby be provided with a corresponding surface profile in order to contact or to encompass the swirler in such a way that a particularly good heat conductivity and solderability is ensured. The swirler is thereby preferably inserted into the pipe following the sliding plate, so as to ensure a good guide in the respective fluid channel of the pipe.

In a further embodiment of the method according to the invention, provision is made for the pipe to be press-fitted against the sliding plate and the swirler. Due to the fact that the pipe may simply be compressed from the outside for this purpose, this process represents a particularly simple, quick and reliable method for press-fitting the individual components.

It is thereby a basic idea of the thermal component according to the invention to provide a thermal component with high heat conductivity, which is not only constructed of largely standardized components, but which can additionally be produced easily, quickly and cost-efficiently.

In a first embodiment of the thermal component according to the invention, provision is made for the inner profile to be formed by a sliding plate, which is arranged between pipe and swirler, in order to increase the press-fitting of swirler and pipe and to ensure a good solderability of both components. It is thereby preferred that the inner profile is formed by a sliding plate, which is arranged between pipe and swirler, so that a standardized pipe without specific inner profile of its fluid channel can be used. At the same time, the swirler does not need to have a press fit in the fluid channel, because the press-fitting between swirler and pipe is only obtained via the sliding plate. The swirler can thus be easily inserted into the fluid channel of the pipe. The sliding plate is preferably provided with a surface profile, so that the stiffness thereof for insertion between pipe and swirler is increased and the press-fitting thereof and solderability with these components is improved. Particularly preferably, at least one of the surfaces of the sliding plate has a corrugated profile, which can be embodied particularly easily by means of rollers or punches. A particularly high heat conductivity is thereby attained, when a flat surface of the sliding plate contacts a flat inner surface of the fluid channel, while the other surface thereof at least partially encompasses the swirler and thus forms particularly large-area contact sections.

In a further embodiment of the thermal component according to the invention, provision is made for the inner profile to be embodied monolithically with the pipe, so that a sliding plate is generally unnecessary. A good press-fitting of swirler and pipe is nonetheless created, which also guarantees a corresponding solderability. It goes without saying, however, that provision can also be made in this embodiment for an additional sliding plate, which further increases the press-fitting as well as the thermal contact between swirler and pipe.

In a further embodiment of the thermal component according to the invention, provision is made for the pipe to be embodied with a longitudinal gap for the sliding plate, which allows for a particularly simple insertion of the sliding plate into the pipe. This is in particular the case, when the swirler is inserted into a fluid channel of the pipe only subsequently, and the pipe is eventually press-fitted against the sliding plate and the swirler.

In a further embodiment of the thermal component according to the invention, provision is made for the swirler to be embodied as a sheet, which is curved in an S-shaped manner, which allows for the particularly simple production thereof from a strip of flat strip material, which can be rolled or punched into shape, for example. The sequence of the loop lines of the flat strip material located on the outside thereby defines the outer profile of the swirler, which is to be entangled with the inner profile of the fluid channel of the rotor.

In a further embodiment of the thermal component according to the invention, provision is made for the pipe to have a rectangular fluid channel, which, on the one hand, allows the use of standardized pipes, and which, on the other hand, provides for a particularly simple design of the sliding plate. The latter can in particular have a surface, which is flat on the pipe side and profiled on the channel side, which allows for a particularly high heat conductivity across the swirler, the sliding plate and the pipe.

In a further embodiment of the thermal component according to the invention, provision is made for the pipe to have at least one lateral opening, via which a branching of a swirled fluid flow is possible. The thermal component designed in this way can thus be used for example as distributor pipe. A connecting pipe is preferably press-fitted against swirler and sliding plate in the opening, so that, in addition to the thermal contacting, these two components can simultaneously take over the function of a sealing of the connecting pipe. It goes without saying that thermal components according to the invention can, in turn, also be connected via the openings.

In a further embodiment of the thermal component according to the invention, provision is made for the pipe to have a plurality of fluid channels comprising at least one swirler, so that even entire assembly groups can be realized with one pipe, for example for cooling systems in a vehicle, which is driven by electric motor.

Due to the simple and cost-efficient producibility and simultaneously high heat conductivity of the thermal component according to the invention, the latter is to preferably be used as heat exchanger pipe or as distributor pipe in a vehicle, which is driven by electric motor.

It goes without saying that the above-mentioned features and the features, which will be described below, cannot only be used in the respective specified combination, but also in other combinations or alone, without leaving the scope of the invention at hand.

Further features and advantages of the invention follow from the from the drawings and from the corresponding description of the drawings.

BRIEF DESCRIPTION OF THE DRAWINGS

Four preferred exemplary embodiments of the invention will be illustrated below in the drawings and will be described in more detail in the description below, whereby identical reference numerals refer to identical or similar or functionally identical components. The drawings are provided herewith for purely illustrative purposes and are not intended to limit the scope of the present invention.

In the drawings,

FIG. 3a shows a perspective front view of a pipe for producing a second thermal component according to the invention;

FIG. 3b shows a perspective front view of a first sliding plate (left) and of a swirler (right) for the pipe of FIG. 3a;

FIG. 3c shows a perspective front view of a second, alternative or additional sliding plate for the swirler of FIG. 3b;

DETAILED DESCRIPTION OF THE DRAWINGS

Figure 1:
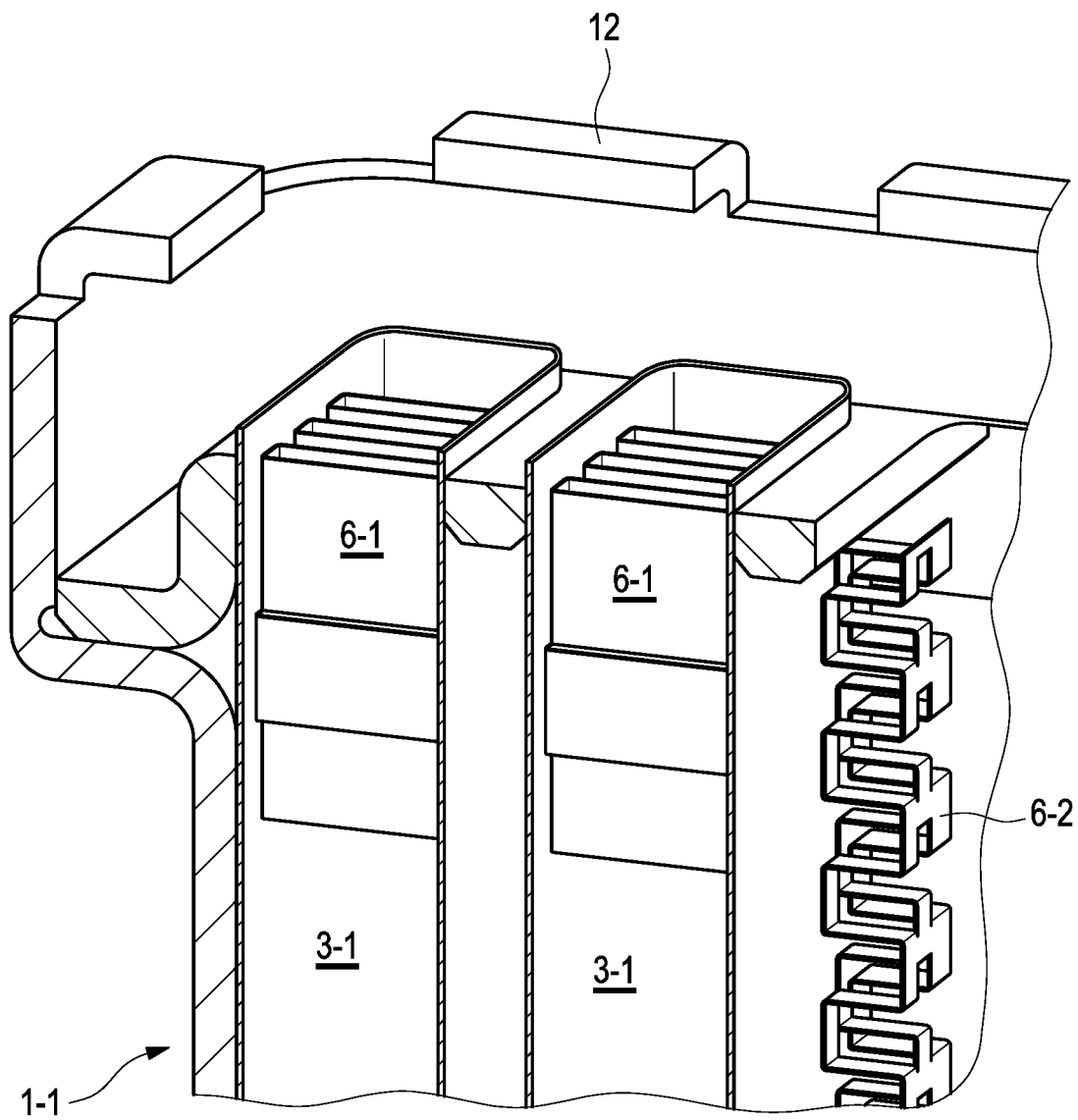
FIG. 1 shows a cut perspective view of an air coolant heat exchanger from the prior art.

FIG. 1 shows a cut perspective view of an air coolant heat exchanger from the prior art, comprising a thermal component 1-1, which comprises pipes 2-1, in the fluid channel 3-1 of which air swirlers 6-1 are arranged. A respective coolant swirler 6-2 is attached between the pipes 6-1, so that the thermal contact via the respective pipe 2-1 is established to the swirler 6-1 in the fluid channel 3-1 thereof. The respective coolant swirler 6-2 is simultaneously used to catch the mechanical forces, which appear in the pipe 2-1 in response to the press-fitting of the air swirler 6-1. The production of the thermal component 1-1 is thus extensive and expensive. The thermal component 1-1 is accommodated in a housing 12 here, so that it can be installed as an integrated heat exchanger unit.

Figure 2:
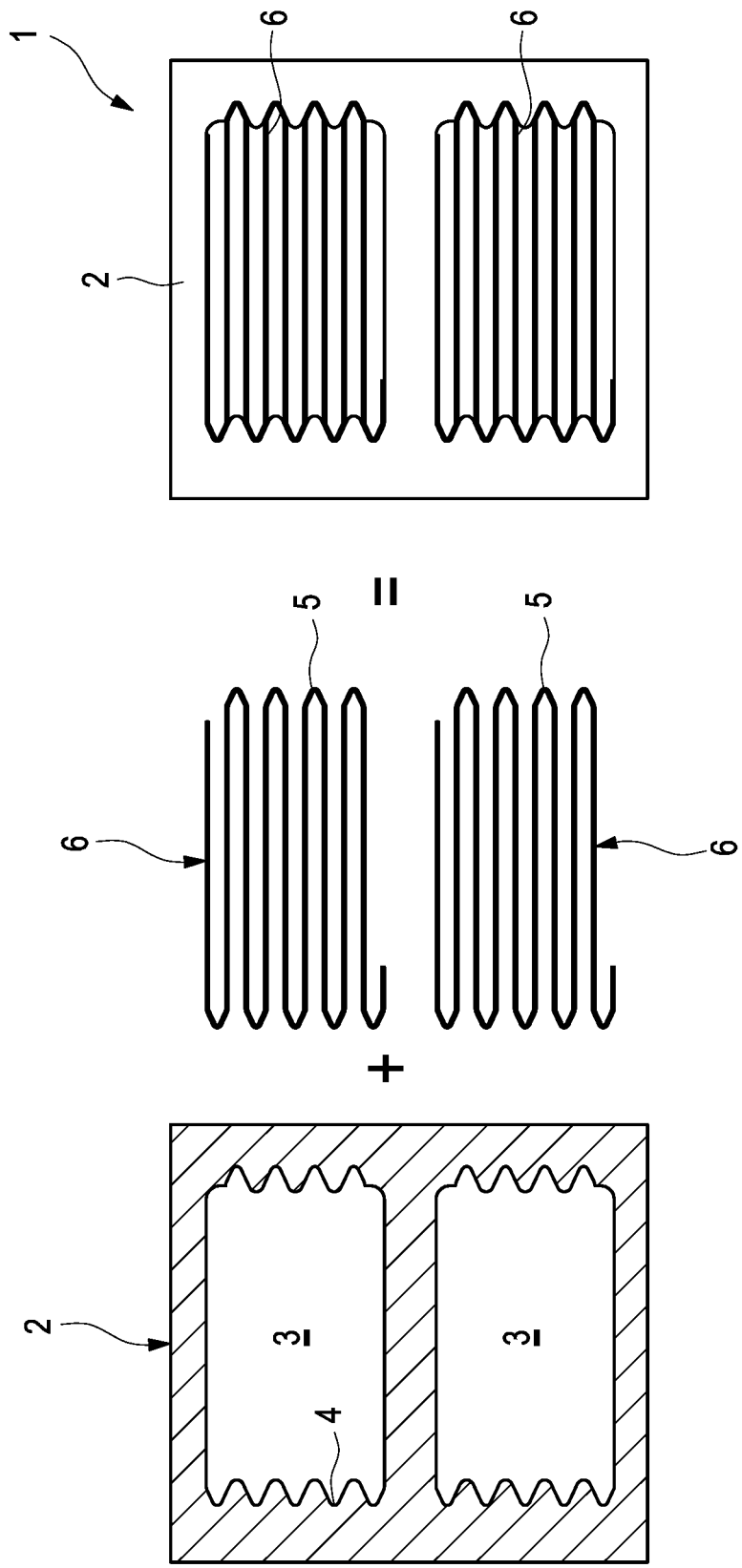
FIG. 2 shows a schematic illustration of the method steps for producing a first thermal component according to the invention.

FIG. 2 shows a schematic illustration of the method steps for producing a first thermal component 1 according to the invention, in the case of which a pipe 2 has two fluid channels 3, which are provided with a corrugated, laterally arranged inner profile 4. Such a pipe 2 can be produced particularly easily, for example in an extrusion process, but can also be provided as continuous strand casting part. A swirler 6 comprising an outer profile 5, which engages with the inner profile 4 of the fluid channels, is inserted into the fluid channels 3, so that the swirler 6 is held in its desired position at least with a press fit. If a higher press-fitting is to be established, a sliding plate, which is formed in accordance with the inner/outer profile and which imparts a press fit to the swirler 6, can also be inserted in a further step. In this example, the swirler 6 is made of a flat strip material, which is turned over in a meandering manner, which can moreover also have punch-outs and/or die-cuts for swirling a fluid. The first thermal component according to the invention, which is eventually obtained, comprising the swirler 6 inserted therein, is eventually illustrated on the right-hand side of FIG. 2. A soldering of the swirler 6 in the pipe 2 can be carried out on the two sides thereof.

Figure 3:
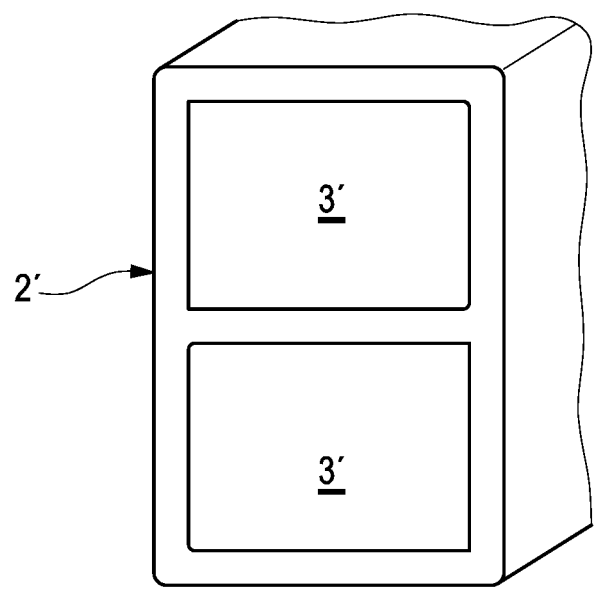
Figure 3:
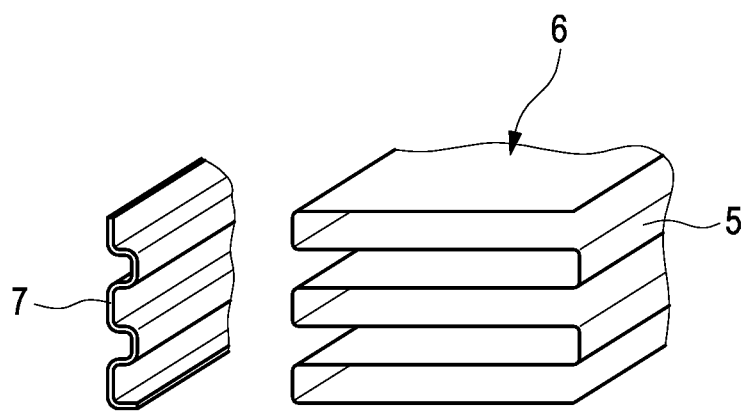
Figure 3:
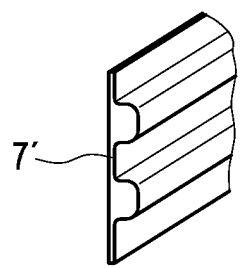

FIG. 3a shows a perspective front view of a pipe 2' for producing a second thermal component according to the invention, which, similarly to the pipe 2 in FIG. 2, has two fluid channels 3', which, however, are not provided with an inner profile. Such a pipe 2' can be produced as a standardized extrusion or continuous strand casting part in a particularly simple manner.

FIG. 3b shows a perspective front view of a first sliding pate 7 (left) and of a swirler 6 (right) for the pipe of FIG. 3a, wherein the sliding plate 7, which is rolled here, performs the function of an inner profile in the fluid channel 3' of the pipe 2' of FIG. 3a. An outer profile 5 of the swirler 6, which is designed as in FIG. 2, thereby engages with the corrugation of the sliding plate 7 on the channel side, wherein a press-fitting of the swirler 6 is ensured in the pipe 2' in the same way as a good heat conductivity towards the pipe 2'. The production of the sliding plate 7 and of the standardized pipe 2' as well as the press-fitting of the swirler 6 in the fluid channel 3' with the help of the sliding plate 7 can thereby be carried out easily, reliably and as quickly as possible and also in an automated manner.

FIG. 3c shows a perspective front view of a second, alternative or additional sliding plate 7' for the swirler 6 of FIG. 3b. The sliding plate 7', which is punched here, has a flat surface and a corrugated surface, which forms the inner profile of the fluid channel 3'. The outer profile 5 of the swirler 6, in turn, engages with this inner profile. The surface of the sliding plate 7', which is flat on the pipe side, thereby ensures a particularly good thermal contact and thus a particularly high heat conductivity towards the pipe 2'.

The sliding plates of FIGS. 3b and 3c can thereby be combined selectively, for example the sliding plate 7 can be used on the left-hand side and the sliding plate 7' on the right-hand side of the swirler 6. The heat conductivity of the pipe 2' can thereby be controlled as a function of the side as needed, when different heat conductivities appear to be required based on the position of the pipe 2' in an assembly space.

Figure 4:
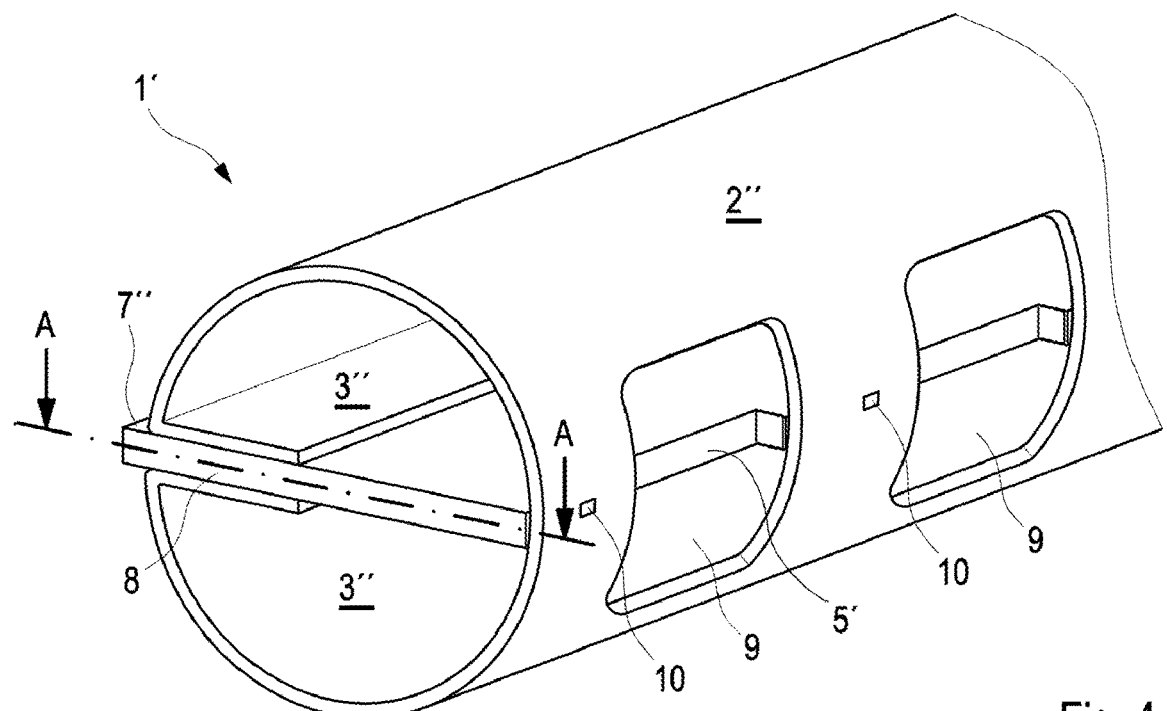
FIG. 4a shows a perspective view of parts of a third thermal component according to the invention comprising an longitudinally slit pipe with a sliding plate.
FIG. 4b shows a view cut in plane A-A of FIG. 4a of the sliding plate thermal component illustrated there with a corresponding swirler.
Figure 4:
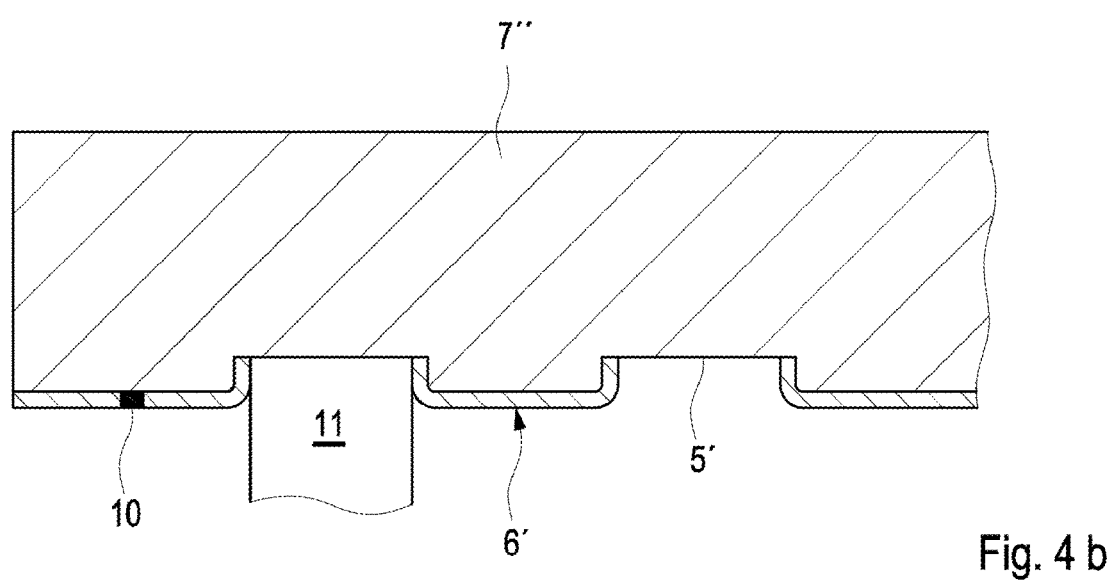

FIG. 4a shows a perspective view of a third thermal component 1' according to the invention comprising a longitudinally slit pipe 2", in the gap 8 of which a sliding plate 7" has been inserted. Not shown in FIG. 4a is a swirler. Two fluid channels 3", which can have different flow directions, for example, are thus embodied in the pipe 2". A correspondingly formed swirler can be inserted into these fluid channels 3" and the pipe 2" can eventually be press-fitted against the sliding plate 7" and the swirler or the swirlers coming from the outside. Even though this process changes the outer dimensions of the pipe 2", the thermal component 1' could also be soldered here, when the tolerances of the thermal component 1' can be adhered to. Corresponding solder points 10 are attached between lateral openings 9 of the pipe 2" for the inlet or outlet of a fluid. The openings 9 thereby allow the use of the third thermal component 1' according to the invention as distributor pipe, to which connecting pipes can be connected.

FIG. 4b shows a view cut in plane A-A of FIG. 4a of the sliding plate 7" of thermal component 1', including a swirler 6'. The sliding plate 7" comprises a corrugated surface, which acts as an inner profile of the pipe 2" here and with which an outer profile 5' of the swirler 6' engages, which is also press-fitted by a connecting pipe 11 in the area of the openings 9, can be seen. The swirler 6' is fixed to the sliding plate 7" via soldering points 10. The third thermal component 1' according to the invention, which is illustrated in FIGS. 4a and 4b, can also be produced in a simple, quick and cost-efficient way and can in particular serve as distributor pipe, to which pipes—in turn according to the invention—can also be attached as connecting pipes. For example, the swirler 6' may be formed monolithically with the pipe 2" by stamped portions of the pipe 2" itself around the lateral openings 9.

A combination of individual features of the described embodiments and production sequences of the first to third thermal component is also possible and lies within the knowledge and ability of the person of skill in the art. Individual components can thereby also be omitted or can be replaced by equal components of other embodiments, depending on which specific demands are to be made on the thermal component. All embodiments thereby have in common that they allow for the simple, quick and cost-efficient production of a thermal component with high heat conductivity, based on components, which are standardized as far as possible.

What is claimed is:

1. A thermal component (1, 1'), comprising a pipe (2, 2', 2") comprising
    a fluid channel (3, 3', 3") and a swirler, the fluid channel (3, 3', 3") of the pipe (2, 2', 2") including an inner profile (4, 4') corresponding to an outer profile (5, 5') of the swirler (6, 6'), the swirler being disposed in the fluid channel (3, 3', 3"),
    wherein the inner profile (4, 4') is formed by a sliding plate (7, 7', 7"),
    wherein the wall of the pipe (2') has a longitudinal gap (8), through which the sliding plate (7") extends into the pipe.

2. The thermal component (1, 1') according to claim 1, wherein the sliding plate (7, 7', 7") has a surface profile.

3. The thermal component (1, 1') according to claim 1, wherein at least one of the surfaces of the sliding plate (7, 7', 7") has a corrugated profile.

4. The thermal component (1, 1') according to claim 1, wherein the pipe (2') has at least one lateral opening (9).

5. The thermal component (1, 1') according to claim 4, wherein a connecting pipe (11) is press-fitted against the swirler (6, 6') and the sliding plate (8) in the lateral opening (9).

6. The thermal component (1, 1') according to claim 1, wherein the pipe (2, 2', 2") comprises a plurality of the fluid channel (3, 3', 3"), each of which comprises one of the swirler (6, 6').

* * * * *